Sept. 7, 1965
E. L. POLLITZER
3,205,272
PHENOL RECOVERY
Filed Oct. 16, 1961
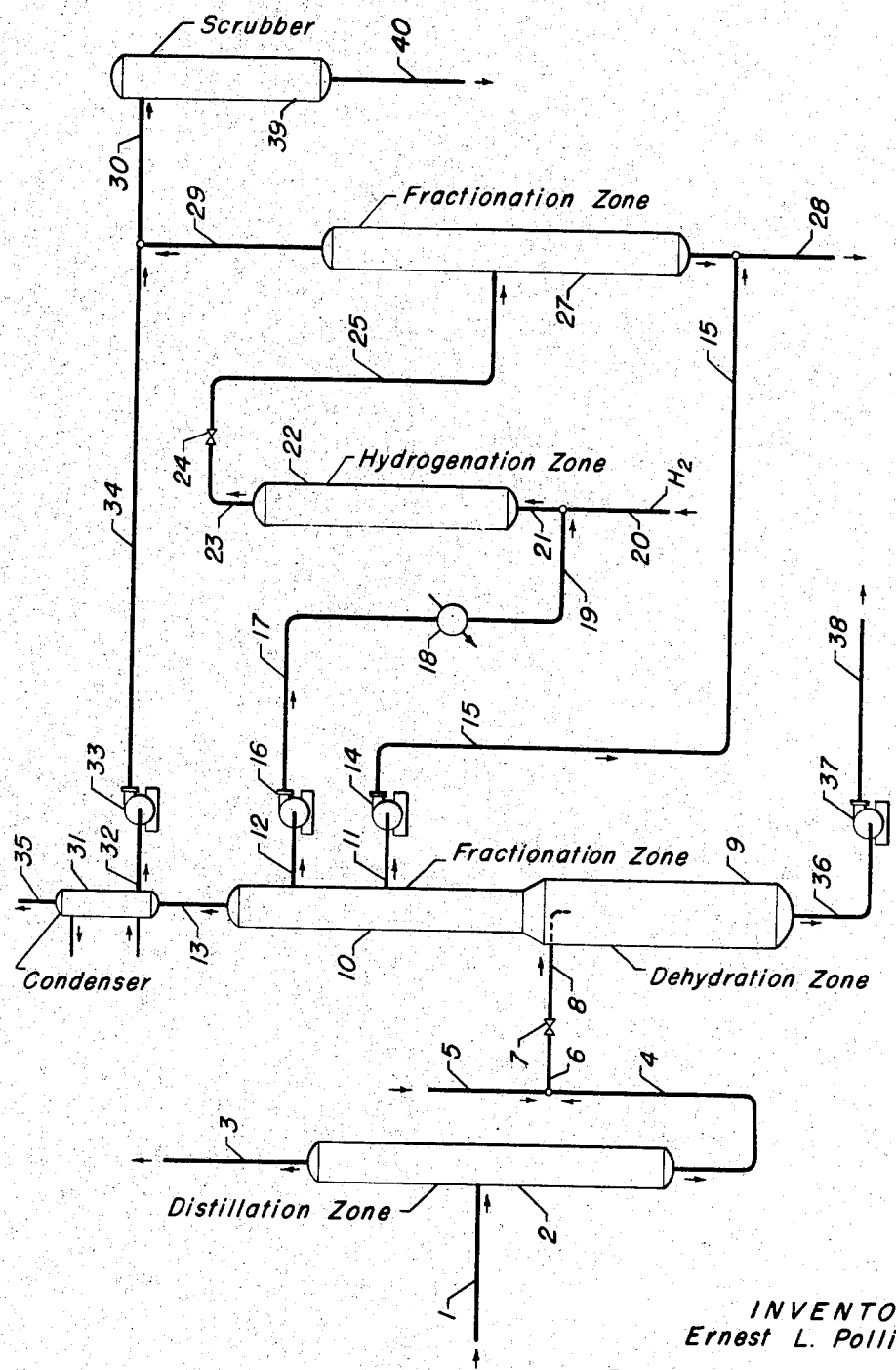
INVENTOR:
Ernest L. Pollitzer
BY: Chester J. Giuliani
James R. Hoatson Jr.
ATTORNEYS

3,205,272
PHENOL RECOVERY
Ernest L. Pollitzer, Hinsdale, Ill., assignor to Universal Oil Products Company, Des Plaines, Ill., a corporation of Delaware
Filed Oct. 16, 1961, Ser. No. 145,227
6 Claims. (Cl. 260—621)

This invention relates to the recovery of a phenol from a reaction mixture resulting from the decomposition of an aralkyl tertiary hydroperoxide, and in particular to the recovery of phenol from a reaction mixture resulting from the decomposition of cumene hydroperoxide.

Phenols are readily prepared by the oxidation of an aryl tertiary alkane and the subsequent decomposition of the resulting aralkyl tertiary hydroperoxide to form a decomposition reaction mixture comprising a phenol, a ketone, and unreacted aryl tertiary alkane. For example, phenol is prepared by the oxidation of cumene and the subsequent decomposition of the resulting cumene hydroperoxide to form a reaction mixture comprising phenol, acetone, and unreacted cumene. In addition to the phenol, ketone, and aryl tertiary alkane, the decomposition reaction mixture further comprises small amounts of an aryl tertiary alkene and an aryl tertiary alkanol derivative of the aryl tertiary alkane subjected to oxidation in the first instance. In the case of cumene hydroperoxide, derived from the oxidation of cumene, the aryl tertiary alkene is alpha-methyl styrene and the aryl tertiary alkanol is alpha, alpha-dimethylbenzyl alcohol. In the recovery of phenol from the aforesaid reaction mixture by distillation methods, the reaction mixture is exposed to conditions conducive to polymerization and alkylation involving the active phenol nucleus, the alpha-methyl styrene, and the alpha, alpha-dimethylbenzene alcohol. As a result, the over-all yield of the desired phenol product is reduced and undesirable by-products formed to adversely effect the recovery of a substantially pure phenol product.

It is an object of the present invention to provide a novel process for the recovery of a phenol from a reaction mixture resulting from the decomposition of an aralkyl tertiary hydroperoxide.

It is a more specific object to present a process for the recovery of phenol from a reaction mixture resulting from the decomposition of cumene hydroperoxide, and comprising phenol, acetone, alpha, alpha-dimethylbenzyl alcohol, alpha-methyl styrene, and unreacted cumene, whereby said alcohol and said methyl styrene are separated from the reaction mixture prior to exposure to process conditions conducive to undesirable by-product formation.

In one of its broader aspects the present invention relates to the recovery of a phenol from a reaction mixture resulting from the decomposition of an aralkyl tertiary hydroperoxide and comprising said phenol, a ketone, an aryl tertiary alkanol and an aryl tertiary alkene, and embodies an improvement in the process of recovering the phenol from said reaction mixture which comprises distilling the ketone from said reaction mixture, dehydrating the aryl tertiary alkanol and forming additional aryl tertiary alkene by contacting the ketone-free reaction mixture with iodine in a dehydration zone at dehydration reaction conditions comprising an elevated temperature and a reduced pressure, separating the resulting reaction mixture into a phenol fraction and an aryl tertiary alkene fraction in a fractionation zone, said fractionation zone being in open communication with the aforesaid dehydration zone, and separately recovering said phenol fraction.

More specifically, the present invention relates to the recovery of phenol from a reaction mixture resulting from the decomposition of cumene hydroperoxide and comprising said phenol, acetone, alpha-methyl styrene, alpha, alpha-dimethylbenzyl alcohol, and unreacted cumene, and embodies an improvement which comprises passing said reaction mixture to a separation zone and therein distilling the acetone fraction from said reaction mixture, passing the acetone-free reaction mixture to a dehydration zone which is in open communication with a fractionation zone, dehydrating the alpha, alpha-dimethylbenzyl alcohol portion of said reaction mixture to form additional alpha-methyl styrene by contacting said reaction mixture with iodine in the aforesaid dehydration zone at a temperature of from about 80° C. to about 110° C. and at a reduced pressure of from 3.2″ Hg to about 9.4″ Hg, separating the resulting reaction mixture into a phenol fraction, an alpha-methyl styrene-phenol fraction, and a cumene fraction at substantially the aforesaid conditions of reduced pressure in said openly communicating fractionation zone, separately recovering the cumene fraction and the phenol fraction, conducting the methyl styrene-phenol fraction to a hydrogenation zone and converting the methyl styrene to cumene therein by contacting said methyl styrene-phenol fraction with hydrogen in the presence of a catalyst comprising nickel on a silica-alumina support and at a temperature of from about 20° C. to about 75° C. and at a pressure of from about 25 p.s.i.g. to about 125 p.s.i.g., passing the resulting cumene-phenol solution to a second fractionation zone, separating and recovering the cumene as the overhead distillate and separately recovering the phenol.

Further objects and embodiments of the present invention will become apparent in the following detailed description thereof.

In accordance with the process of this invention a phenol is recovered from a reaction mixture resulting from the decomposition of an aralkyl tertiary hydroperoxide. The aralkyl tertiary hydroperoxides of this invention are the oxidation products of arylalkanes, and particularly aryl tertiary alkanes. For example, aryl tertiary alkanes including cumene, p-cymene, p-isopropylethylbenzene, p-diisopropylbenzene, p-t-butylisopropylbenzene, sec-butylbenzene, diphenylethane, 2-isopropylnaphthalene, and the like, may be oxidized to their corresponding hydroperoxides, i.e., cumene hydroperoxide, alpha, alpha, 4-trimethylbenzyl hydroperoxide, 4-ethyl-alpha, alpha-dimethylbenzyl hydroperoxide, alpha, alpha, alpha′, alpha′-tetramethyl-p-xylylene dihydroperoxide, p-t-butyl-alpha,alpha-dimethylbenzyl hydroperoxide, alpha-methyl-alpha-ethylbenzyl hydroperoxide, alpha-methyl-alpha-phenylbenzyl hydroperoxide, 2-naphthyl-dimethylmethyl hydroperoxide, etc. The aralkyl tertiary hydroperoxides, of which the above are illustrative, may be represented by the general formula

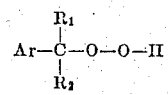

wherein Ar represents an aromatic hydrocarbon radical which may be an aryl radical or an alkaryl radical, and the hydroperoxyl group (—O—O—H) is attached to a tertiary carbon atom, which in turn is attached to the aromatic nucleus by a single bond, and $R_1$ and $R_2$ may be the same or different hydrocarbon radicals selected from the group consisting of alkyl, cycloalkyl, aryl, aralkyl and alkaryl hydrocarbon radicals.

In the preparation of phenols by the oxidation of an aryl tertiary alkane and decomposition of the resulting aralkyl tertiary hydroperoxide there is formed, in addition to the desired phenol product, an undesirable alcohol and an olefin by-product herein described as an arylalkene and an arylalkanol derivative of said aryl tertiary alkane subjected to oxidation in the first instance. The unsaturation in the alkyl tertiary olefin, and the hydroxyl group of the aryl tertiary alkanol, occurs at the tertiary carbon atom attached to the aromatic nucleus of said aryl tertiary alkane.

Thus the process of the present invention relates to the recovery of a phenol from a reaction mixture resulting from the decomposition of an aralkyl tertiary hydroperoxide and comprising a phenol, a ketone, an aryl tertiary alkanol and an aryl tertiary alkene derivative of the aryl tertiary alkane subjected to oxidation in the first instance, as well as the unreacted aryl tertiary alkane and includes the recovery of a phenol from a reaction mixture resulting from the decomposition of cumene hydroperoxide and comprising phenol, acetone, alpha, alpha-dimethylbenzyl alcohol, alpha-methyl styrene, and unreacted cumene, the recovery of a p-cresol from a reaction mixture resulting from the decomposition of alpha, alpha,4-trimethylbenzyl hydroperoxide and comprising p-cresol, acetone, alpha,alpha,4-trimethylbenzyl alcohol, alpha,4-dimethyl styrene, and unreacted p-cymene, the recovery of p-ethylphenol from a reaction mixture resulting from the decomposition of 4-ethyl-alpha, alpha-dimethylbenzyl hydroperoxide and comprising p-ethylphenol, acetone, 4-ethyl-alpha,alpha-dimethylbenzyl alcohol, 4-ethyl-alpha-methyl styrene, and unreacted p-ethylisopropylbenzene, also to the recovery of phenol from a reaction mixture resulting from the decomposition of alpha-methyl-alpha-ethylbenzyl hydroperoxide and comprising phenol, 2-butanone, alpha-methyl-alpha-ethylbenzyl alcohol, alpha-ethyl styrene, and unreacted sec-butylbenzene, etc.

While the process of this invention is operable to recover a phenol from a reaction mixture resulting from the decomposition of other aralkyl tertiary hydroperoxides as described above, it is primarily directed to the recovery of phenol from a reaction mixture resulting from the decomposition of cumene hydroperoxide, and the further description of the process of this invention is set out in relation thereto and with reference to the attached schematic drawing.

Referring then to the drawing, the cumene hydroperoxide decomposition reaction mixture, resulting from the decomposition of cumene hydroperoxide and comprising acetone, phenol, alpha, alpha-dimethylbenzyl alcohol, alpha-methyl styrene, and unreacted cumene, is charged through line 1 to a distillation zone 2 operated at substantially atmospheric pressure, wherein the acetone is distilled from the reaction mixture and passes overhead through line 3 to storage facilities not shown.

The acetone-free decomposition reaction mixture is withdrawn from the base of said separation zone 2 through a conduit 4 and passes to a pressure reducing valve 7 by way of line 6 in the presence of iodine introduced thereto by means of an inlet 5. The reaction mixture passes through said pressure reducing valve to a dehydration zone 9 by way of line 8. The dehydration zone is in open communication with a fractionation zone 10, said dehydration zone and said fractionation zone being maintained at a reduced pressure of from about 0.8″ Hg to about 16.5″ Hg, and preferably at a pressure of from about 3.2″ Hg to about 9.4″ Hg.

The decomposition reaction mixture descends through the dehydration zone 9, which may comprise either a column containing an inert packing such as glass beads or unpacked column, in the presence of the aforementioned iodine at a temperature of from about 50° C. to about 130° C., and preferably at a temperature of from about 80° C. to about 110° C. The alpha-alpha-dimethylbenzyl alcohol portion of the decomposition reaction mixture is dehydrated to alpha-methyl styrene during passage through the dehydration zone at the aforesaid dehydration temperature by the action of catalytic amounts of iodine which may comprise from about 0.005 wt. % to about 0.1 wt. % of the decomposition reaction mixture introduced through line 8. While larger quantities of iodine are operable, no particular benefit results by reason thereof and it is preferred to utilize an amount within the aforesaid limits.

During the course of passage through the dehydration zone 9, the alpha, alpha-dimethylbenzyl alcohol is converted to alpha-methyl styrene. The methyl styrene, phenol, and cumene portion of the resulting reaction mixture distills upwardly from the dehydration zone through the aforementioned openly communicating fractionation zone 10 and is separated therein into a phenol fraction withdrawn through a takeoff line 11, a methyl styrene-phenol fraction withdrawn through a second take-off line 12, and a cumene fraction withdrawn through line 13 as the overhead distillate. A higher boiling portion of the aforesaid resulting reaction mixture continues downwardly through the dehydration zone 9 and exits therefrom through line 36 and is discharged at atmospheric pressure by means of a pump 37 and outlet 38. The higher boiling portion, comprising acetophenone and other higher boiling by-products of the decomposition reaction, is separately recovered.

The aforesaid method is particularly adapted to a continuous type of operation in that periodic shut downs for catalyst replacement are not necessitated. While the dehydration and fractionation step above described may be accomplished at atmospheric pressure, it is preferred to operate at the aforesaid conditions of reduced pressure. In so doing, the alpha, alpha-dimethylbenzyl alcohol portion of the reaction mixture is converted to alpha-methyl styrene at the relatively mild dehydration reaction conditions herein employed in conjunction with iodine, and said alpha-methyl styrene is separated substantially immediately as formed. Thus, the reaction mixture is not unduly exposed to dehydration and fractionation conditions with risk of undesirable by-product formation.

The phenol fraction, comprising the major portion of the phenol product, is conducted by way of line 11 to a pump 14 and discharged therefrom to line 15 at substantially atmospheric pressure. The cumene fraction, withdrawn through line 13 as the overhead distillate, is condensed in an overhead condenser 31 and withdrawn therefrom through line 32 to a pump 33 and discharged therefrom to line 34 at substantially atmospheric pressure. The iodine is converted to hydrogen iodide in the dehydration process and passes upwardly through the fractionation zone passing overhead through line 13 and the overhead condenser 31 and exits therefrom through line 35. Line 35 is routed to a vacuum source not shown which may be adequately protected from the hydrogen iodide by a caustic scrubber.

The cumene stream from line 34 is combined with a cumene stream from line 29, said stream being formed as hereinafter described, and the combined streams pass by way of line 30 to a caustic scrubber 39. The caustic scrubber, which may comprise sodium bicarbonate, sodium hydroxide, etc. in aqueous solution or in a granular form, serves to eliminate any residual hydrogen iodide which may be present in the cumene stream as a result of the dehydration reaction in the dehydration zone 9. The cumene stream thus treated exits through line 40 to be recycled for oxidation to cumene hydroperoxide or otherwise utilized.

The methyl styrene-phenol fraction, withdrawn from the fractionation zone 10 through the take-off line 12, is generally withdrawn as an azeotropic mixture comprising about 95% alpha-methyl styrene. This azeotropic mixture is discharged to line 17 under pressure by means of pump 16 and passes through a heat exchanger 18 wherein it is cooled so as to maintain a desired temperature of from about 25° C. to about 75° C. in the hydrogenation zone 22. The cooled methyl styrene-phenol stream then passes by way of line 19 to be admixed with a hydrogen stream introduced through an inlet 20, and the combined streams are charged through line 21 to a hydrogenation zone 22 at a pressure of from about 25 p.s.i.g. to about 125 p.s.i.g.

The methyl styrene-phenol fraction is charged to the hydrogenation zone 22 and the methyl styrene portion thereof converted to cumene in the presence of a hydrogenation catalyst, the phenol portion remaining substantially unaffected by the mild hydrogenation conditions existing in said hydrogenation zone. The resulting cumene-phenol solution is withdrawn through line 23 and a pressure control valve 24 and passed through line 25 to a second distillation zone 27 at substantially atmospheric pressure. In the distillation zone 27 the cumene is distilled from the phenol and passes overhead to line 29 to combine with the cumene stream from line 34. The combined streams exit from the recovery process through line 30, the aforementioned caustic scrubber 39, and line 40. The small amounts of water which may be contained in the cumene stream, either as a result of the dehydration reaction or the use of an aqueous caustic scrubber, may be removed by any conventional or convenient drying methods.

Phenol is withdrawn from the distillation zone 27 and is recovered through line 28 in combination with the phenol stream from line 15. The phenol is thus recovered in increased yield and may be further purified by distillation methods without the formation of the undesirable alkylation and polymerization by-products resulting from the presence of alpha, alpha-dimethylbenzyl alcohol and alpha-methyl styrene.

A hydrogenation catalyst is utilized in the hydrogenation zone 22 which is sufficiently active to selectively hydrogenate methyl styrene in the presence of phenol at the relatively mild hydrogenation conditions herein employed. Particularly good results have been achieved through the utilization of palladium on a silica-alumina support, and also nickel on a silica-alumina support. Copper, chromium, and the metals of Group VIII including iron, cobalt, platinum, osmium, iridium, ruthenium, rhodium, and the aforementioned palladium and nickel are also suitable and may be employed either in a finely divided state or, preferably, deposited on a supporting material such as charcoal, alumina, silica-alumina, silica gel, kieselguhr, and the like. The oxides of the aforementioned metals, and in particular the oxides of copper, chromium and nickel, are also suitable catalysts.

The foregoing description of the process of this invention illustrates schematically one preferred method of operation. It is understood that many modifications and variations may be made thereto without departing from the generally broad scope of this invention as set out in the appended claims.

*Example I*

100 gms. of an acetone-free simulated reaction mixture comprising 38.3% cumene, 53.1% phenol, 1.2% alpha-methyl styrene, 2.3% alpha, alpha-dimethylbenzyl alcohol, and 5.1% acetophenone was prepared and admixed with 0.05 gms. of iodine. This reaction mixture was charged to a reaction vessel and heated at about 80° C. The resulting reaction mixture was substantially free of the alpha, alpha-dimethylbenzyl alcohol and on infrared analysis was found to contain 38% cumene, 54% phenol, 2% alpha-methyl styrene, and 6% acetophenone. This resulting reaction mixture is fractionated at reduced pressure and the cumene, phenol, and acetophenone cuts are separated and recovered. The alpha-methyl styrene cut is recovered as an azeotropic mixture with phenol, the phenol comprising about 5% thereof.

A hydrogenation catalyst was prepared by immersing 150 gms. of silica-alumina cracking catalyst in an aqueous solution of 2.5 gms. of palladium chloride. The catalyst was dried and calcined at about 1300° F. Alpha-methyl styrene was processed over this catalyst in the presence of phenol and hydrogen at about 60 p.s.i.g. and at a temperature of about 75° C. Infrared analysis indicated substantially complete conversion of the alpha-methyl styrene to cumene, and a phenol fraction substantially unaffected by the hydrogenation conditions employed.

I claim as my invention:

1. In a process for the recovery of a phenol from a reaction mixture resulting from the decomposition of an aralkyl tertiary hydroperoxide and comprising said phenol, a ketone, an aryl tertiary alkanol and an aryl tertiary alkene, the improvement which comprises distilling the ketone from said reaction mixture, subjecting the ketone-free mixture to dehydration to convert the aryl tertiary alkanol into additional aryl tertiary alkene, separating from the resulting reaction mixture a phenol fraction and a phenol-containing aryl tertiary alkene fraction, subjecting the last-named fraction to selective hydrogenation to convert the aryl tertiary alkene to an aryl tertiary alkane without hydrogenation of the phenol by contacting said last-named fraction with hydrogen in the presence of a hydrogenation catalyst comprising a Group VIII metal at a temperature of from about 20° C. to about 75° C. and at a pressure of from about 25 p.s.i.g. to about 125 p.s.i.g., fractionating the resultant products to separate said alkane from the phenol, commingling the last-mentioned phenol with said phenol fraction and recovering the resultant mixture.

2. The improvement of claim 1 further characterized in that said ketone-free mixture is subjected to dehydration in the presence of iodine.

3. In a process for the recovery of phenol from a reaction mixture resulting from the decomposition of cumene hydroperoxide and comprising said phenol, acetone, alpha, alpha-dimethyl-benzyl alcohol and alpha-methyl styrene, the improvement which comprises distilling the acetone from said reaction mixture, subjecting the acetone-free mixture to dehydration to convert the alpha, alpha-dimethylbenzyl alcohol into additional alpha-methyl styrene, separating from the resulting reaction mixture a phenol fraction and an azeotropic mixture of phenol and alpha-methyl styrene, subjecting said azeotropic mixture to selective hydrogenation to convert the methyl styrene to cumene without hydrogenation of the phenol by contacting said azeotropic mixture with hyrogen in the presence of a hydrogenation catalyst comprising a Group VIII metal at a temperature of from about 20° C. to about 75° C. and at a pressure of from about 25 p.s.i.g. to about 125 p.s.i.g., fractionating the resultant products to separate the cumene from the phenol, commingling the last-mentioned phenol with said phenol fraction, and recovering the resultant mixture.

4. The improvement of claim 3 further characterized in that said acetone-free mixture is subjected to dehydration in the presence of iodine.

5. In a process for the recovery of phenol from a reaction mixture resulting from the decomposition of cumene hydroperoxide and comprising said phenol, acetone, alpha, alpha-dimethylbenzyl alcohol and alpha-methyl styrene, the improvement which comprises distilling the acetone from said reaction mixture, dehydrating the alpha, alpha-dimethylbenzyl alcohol and forming additional alpha-methyl styrene by contacting the acetone-free reaction mixture with iodine in a dehydration zone at a temperature of from about 50° C. to about 130° C. and at a reduced pressure of from about 0.8" Hg to about 16.5" Hg, separating from the resulting reaction mixture a phenol fraction and an azeotropic mixture of phenol and alpha-methyl styrene, subjecting said azeotropic mixture to selective hydrogenation to convert the methyl styrene to cumene without hydrogenation of the phenol by contacting said azeotropic mixture with hydrogen in the presence of a hydrogenation catalyst comprising a Group VIII metal at a temperature of from about 20° C. to about 75° C. and at a pressure of from about 25 p.s.i.g. to about 125 p.s.i.g., fractionating the resultant products to separate the cumene from the phenol, commingling the last-mentioned phenol with said phenol fraction, and recovering the resultant mixture.

6. In a process for the recovery of phenol from a reaction mixture resulting from the decomposition of cumene hydroperoxide and comprising said phenol, acetone, alpha, alpha-dimethylbenzyl alcohol, alpha-methyl styrene, and cumene, the improvement which comprises passing said reaction mixture to a separation zone and therein distilling the acetone fraction from said reaction mixture, passing the acetone-free reaction mixture to a dehydration zone and therein dehydrating the alpha, alpha-dimethylbenzyl alcohol portion of said reaction mixture to form additional alpha-methyl styrene by contacting said reaction mixture with iodine in the aforesaid dehydration zone at a temperature of from about 80° C. to about 110° C. and at a reduced pressure of from about 3.2″ Hg to about 9.4″ Hg, separating the resulting reaction mixture into a phenol fraction, an alpha-methyl styrene-phenol fraction, and a cumene fraction at substantially the aforesaid conditions of reduced pressure, separately recovering the cumene fraction and the phenol fraction, conducting the alpha-methyl styrene-phenol fraction to a hydrogenation zone and converting the alpha-methyl styrene to cumene therein by contacting said alpha-methyl styrene-phenol fraction with hydrogen in the presence of a hydrogenation catalyst comprising a metal of Group VIII at a temperature of from about 20° C. to about 75° C. and at a pressure of from about 25 p.s.i.g. to about 125 p.s.i.g., passing the resulting cumene-phenol solution to a fractionation zone and therein separating the cumene as the overhead distillate from the phenol, and commingling the latter with said phenol faction for recovery therewith.

References Cited in the file of this patent

UNITED STATES PATENTS

| | | |
|---|---|---|
| 2,471,922 | 5/49 | Axe. |
| 2,715,145 | 8/55 | Bewley et al. _____ 260—621 |
| 2,728,793 | 12/55 | Armstrong et al. _____ 260—621 |
| 2,824,049 | 2/58 | Maincon et al. _____ 260—621 |

FOREIGN PATENTS 802,054  9/58  Great Britain.

OTHER REFERENCES

Voronkov et al., Chem. Abstracts, 44:1955–1956 (1950) (1 page).

LEON ZITVER, *Primary Examiner.*

CHARLES B. PARKER, HAROLD G. MOORE,
*Examiners.*